United States Patent Office 2,779,477
Patented Jan. 29, 1957

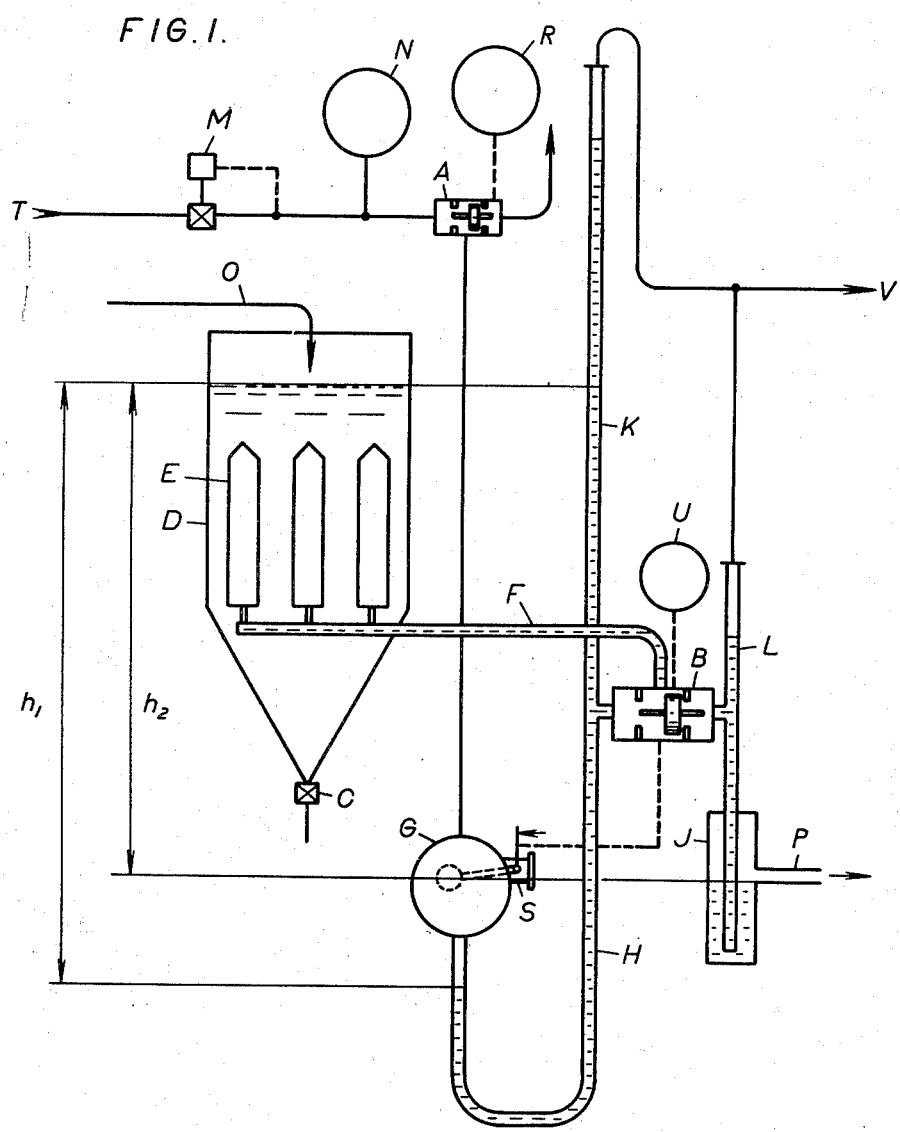

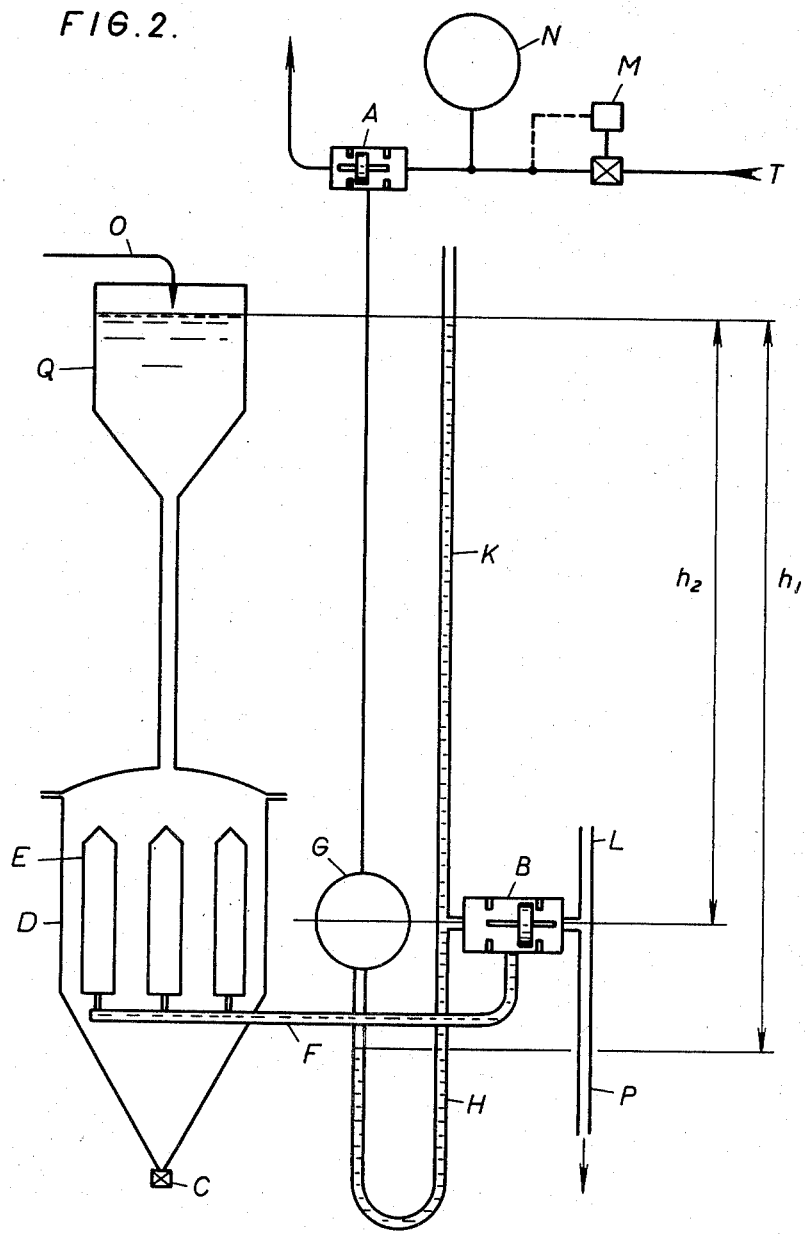

2,779,477

FILTER PLANT

Gunder G. U. W. Swensen, Heroya, near Porsgrunn, Norway, assignor to Norsk Hydro-Elektrisk Kvaelstofaktieselskab, Oslo, Norway Application May 13, 1954, Serial No. 429,579

3 Claims. (Cl. 210—150)

Claims priority, application Norway May 19, 1953

The present invention relates to a filter thickening plant for the filtering of relatively small quantities of solids from large quantities of liquid. It is already known that in such plants an effective utilization of the filter surface can be obtained by removing the filter cake from the filter cloth at short intervals by conducting the filtrate back through the filter at periodic intervals. The present invention relates to a filter thickening plant which operates on a combination of the thickener and the filter principles. The operation is, as will be understood, a cyclic process in which periods of filtering alternate with periods in which the filter medium is cleaned by reversal of flow of the filtrate and thereby making the filter ready for a new period of filtering. The submerged cake, forming upon the filtration medium, is periodically removed by the application of low pressure filtrate solution on the outlet side of the filter medium.

Owing to the large quantities of liquid involved, certain problems arise in connection with the redirection of the motion of the liquid masses. The liquid masses should be redirected in the shortest possible period of time, but at the same time the reversal must be effected in such a manner that an elastic and pliant operation is attained without the occurrence of any stroke of the liquid.

The primary object of the present invention is to provide an automatically operating filter plant of the kind indicated, in which stroke of the liquid is avoided and at the same time the redirection of the liquid masses is effected as quickly as possible. This, according to the invention, is attained, inter alia, by the installation of an alternating valve with one branch which is always connected to the outlet conduit from the filter, and two further branches which alternately can be connected to the first-mentioned branch, and which are also connected to a discharge conduit for the filtrate and to a liquid container, respectively, from which the filtrate can be led back to the filter.

The plant further comprises, according to the invention, a device which automatically effects a redirection of the alternating valve from the position in which the filter is connected to the said liquid container to the position in which the filter is connected to the discharge conduit at the moment the pressure on both sides of the valve is equal.

Finally the plant comprises a compressed air source and an alternating valve, which in one position connects the upper part of the liquid container to the compressed air source and in another position to the atmosphere, and a device which after predetermined intervals of time transposes the said alternating valve.

A number of further features of the invention will be apparent from the following description, together with the drawing. Fig. 1 shows schematically a filter thickening plant in which the atmospheric pressure provides the driving force in the filtering process, that is a vacuum filtering plant; and Fig. 2 shows schematically an arrangement according to which the filter thickener works as a pressure filter.

In Figure 1, D denotes a thickening container with a conical bottom. In this is fitted a plurality of filter cells E. The outlet branch from each cell is connected to a collecting pipe F, which is connected to an automatically governed alternating valve B. Through this valve the collecting pipe F can be placed in connection with the container G, via the loop pipe H. By the alternating action of the valve the collecting pie is connected to the liquid trap J. The conduits between the alternating valve B and the container G or liquid trap J have vertical branches K and L, both of which are connected to a vacuum source V.

By means of an automatic time-controlled alternating valve A, the container G can be connected with a compressed air source T. The pressure in the container is governed by an automatic pressure regulator M. By an adjustment of valve A the air in container G can be blown off to the atmosphere. For stabilization of the compressed air in conformity with the pressure regulator a pressure equalizing container N is coupled between the pressure regulator and valve A.

Unfiltered lye is supplied at O. Filtered lye leaves the plant through the overflow P from the liquid trap J. Thick sludge is periodically tapped out through the automatic valve C.

The operation of the filter thickener will appear from the following description of a cycle of operation. The starting condition is:

(a) Thickener filled with unfiltered lye.
(b) Cells connected to container G through alternating valve B.
(c) Container G connected to compressed air source through alternating valve A. Pressure regulator M maintains an air pressure which balances the liquid column $h_1$, and is equivalent to the pressure of $h_1$+barometric pressure.
(d) The vertical branches K and L connected to the vacuum source. The cycle of operation is as follows:

(1) Valve A changes position. The change is governed by a time-conditioned impulse from a device R. The air pressure in container G is blown off to the atmosphere. Gradually as the counter-pressure in container G diminishes, the liquid column in branch K begins to fall, and turbid pre-filtrate will follow through the collecting conduit F.

(2) After a certain time the liquid in container G reaches a level equal to the overflow P from liquid trap J. The size of container G is adjusted relative to the properties of the filter system in such a way that this level in the container is not reached before clear filtrate flows into the alternating valve B. A level sensitive device S causes to the alternation of valve B.

(3) At the instant B alternates, the liquid pressure on both sides of the valve plate will be the same, because the liquid surfaces in G and J are at the same level. The alternation will therefore be able to proceed smoothly and flexibly without any jerking or knocking in the valve.

During the alternation the speed of the liquid in the collecting pipe F remains constant, while clear filtrate begins to flow down to the liquid trap J. Gradually as valve B reaches its new position the velocity of the liquid in pipe loop H is reduced and finally comes to a standstill. The likelihood of any stroke of the water occurring is eliminated by the fact that the retarded water column in H is permitted to oscillate vertically in the evacuated branch K.

(4) Filtering of the clear filtrate is broken off, a time-conditioned impulse from a device U causing new alternation of valve B. The system is so adjusted that the alternation occurs when the layer of sludge on the filter surface has reached a desired thickness. The pressure of liquid on both sides of the valve is still equal. During the alternation, the velocity of the liquid is diminished in the conduit down to the liquid trap. The likelihood of stroke of the water occurring is eliminated at this point, by the provision of the column of liquid in the branch L which is free to oscillate vertically.

(5) After a very brief discharge of the filtrate to container G there follows, by the action of a time-conditioned impulse from R, alternation of valve A. Immediately upon this alternation an overflow of air from air equalizing container N to the container G occurs. At the same time the pressure regulator M functions for the purpose of restoring the original air pressure. When the air pressure in container G reaches a value which is equal to that of liquid column $h_2$, the discharge of filtrate to container G ceases. Immediately the air pressure in the container becomes higher with the result that the liquid in the container is forced upwards through pipe loop H into the filter cells and out through the filter cloth. This back-flow of filtrate causes the sludge cakes to loosen from the filter cloth, whereupon they fall down along the cells and collect at the bottom of container D. The pressure on container G is maintained long enough so that the sludge cakes get time to fall down. Then the cycle begins again, as set forth in paragraph 1 above.

From the above it will be seen how the problems which invariably arise in connection with sudden changes of speed in large masses of liquid are solved. In brief it may be said that the liquid masses are put into motion and stopped again in a flexible manner by change in the pressure conditions in container G. The alternation of valve B can always take place smoothly because the pressure on both sides of the valve during the switch over is always equal. Risk of stroke of the water occurring in the conduits leading from valve B is ruled out by the fact that the water is permitted to oscillate in vertical branches from the said conduits.

Figure 1 illustrates a system in which atmospheric pressure provides the driving force in the filtering process (vacuum filtering). In cases where liquids, the temperature of which is near boiling point, are to be treated it is not practicable to use vacuum filtration, because the lye will boil in the pipe system. Figure 2 shows an arrangement according to which the filter thickener works as a pressure filter.

In this case container D is a closed pressure container which is supplied with lye from an elevated container Q. Container G is placed on a level with the cells. The liquid trap for clear filtrate is left out. The vertical branches K and L are open to the atmosphere. Apart from these modifications the reference characters for the various parts are the same as in Figure 1.

The pressure filter thickener works according to the same principles as the vacuum filter thickener. What has been said above in describing the system and its operation applies to both types.

Finally it may be mentioned that there is nothing to prevent the arrangement in which the cells are turned upside down, whereby the collecting pipe F is connected to the top of the cells.

I claim:

1. A filter thickening plant for filtering relatively small quantities of solids from large quantities of liquid comprising a filter thickener having at least one filter therein, a pipe connected to the outlet side of the filter within said filter thickener, a valve casing provided with three openings one of which is connected with said pipe, a closed container, a pipe connecting said container with a second of said openings in the valve casing, a conduit communicating at its lower end with the connecting pipe between said valve casing and said container and extending to a height such that the liquid will be able to oscillate therein, a discharge conduit being connected with the third of openings in the said valve casing, a second conduit communicating at its lower end with said discharge conduit and extending to a height such that the liquid will be able to oscillate therein, a valve member adjustably mounted in said valve casing in such a manner that it can be moved alternatively into two different positions in one of which the outlet side of said filter and said container communicate through the first and second of said openings in the valve casing, the third of said openings being closed, whereas in the other position of said valve member the outlet side of said filter and said discharge conduit communicate through first and third of said openings in the valve casing, the second of said openings being closed, a device adapted to change the position of said valve member from its first mentioned to its last mentioned position when the liquid level in said container increases beyond a predetermined level, a time controlled device for moving said valve member from its last mentioned to its first mentioned position after a filtering period of a predetermined length of time, a second valve casing provided with three openings being connected with a gas compressor, the upper part of said container and the atmosphere, respectively, a valve member moveably mounted in said valve casing, and a time controlled device for moving said valve member immediately after the end of said filtering period from a position in which the upper part of said container is connected with the atmosphere, the opening in said valve casing communicating with said gas compressor being closed, to a position in which said gas compressor is connected with the upper part of said container, the opening in said valve casing communicating with the atmosphere being closed, maintaining the valve in this position during a cleaning period which is a fraction of said filtering period, and moving said valve member back to its first mentioned position.

2. A filter thickening plant as claimed in claim 1 further comprising a liquid trap connected to the outlet of the discharge conduit, an overflow for filtrate in said liquid trap, and a conduit for connection to a vacuum pump, said conduit communicating with the upper ends of the conduits in which the liquid is able to oscillate.

3. A filter thickening plant for filtering relatively small quantities of solids from large quantities of liquid comprising a filter thickener having at least one filter therein, a pipe connected to the outlet side of the filter within said filter thickener, a valve casing provided with three openings one of which is connected with said pipe, a closed container, a pipe connecting said container with a second of said openings in the valve casing, a vertical conduit communicating at its lower end with the connecting pipe between said valve casing and said container and extending to a height at least as high as the level of the top of the interior of said filter thickener, a discharge conduit connected to the third of said openings in said valve casing, a second vertical conduit communicating at its lower end with said discharge conduit and extending to a height substantially above the level of the discharge conduit, a valve member adjustably mounted in said valve casing in such a manner that it can be moved alternately into two different positions in one of which the outlet side of said filter and said container communicate through the first and second of said openings in the valve casing, the third of said openings being closed, whereas in the other position of said valve member the outlet side of said filter and said discharge conduit communicate through the first and third of said openings in the valve casing, the second of said openings being closed, a device for changing the position of said valve member from its first mentioned to its last mentioned position when the liquid level in said container reaches the level of the discharge conduit, a time controlled device for moving said valve member from its last mentioned to its first mentioned position after a filtering period of a predetermined length of time, a second valve casing provided with three openings being connected with a gas compressor, the upper part of said container and the atmosphere, respectively, a valve member movably mounted in said valve casing and a time controlled device for moving said valve member immediately after the end of said filtering period from a position in which the upper part of said container is connected with the atmosphere, the opening in said valve casing communicating with said gas compressor being closed, to a position in which said gas compressor is connected with the upper part of said container, the opening in said valve casing communicating with the atmosphere being closed, maintaining the valve in this position during a cleaning period which is a fraction of said filtering period, and moving said valve member back to its first mentioned position.

References Cited in the file of this patent

UNITED STATES PATENTS

| | | |
|---|---|---|
| 1,214,152 | Genter | Jan. 30, 1917 |
| 1,263,226 | Genter | Apr. 16, 1918 |
| 1,452,151 | Genter et al. | Apr. 17, 1923 |
| 1,870,381 | Piper | Aug. 9, 1932 |
| 2,035,592 | Christensen | Mar. 31, 1936 |
| 2,046,770 | Coberly et al. | July 7, 1936 |